Jan. 12, 1965  B. M. HORTON  3,165,136
WIRE NUT WITH WORKPIECE ENGAGING MEANS
Filed June 3, 1960

INVENTOR
BILLY M. HORTON
BY *Hurvitz & Rose*
ATTORNEYS

# United States Patent Office 3,165,136
Patented Jan. 12, 1965

3,165,136
WIRE NUT WITH WORKPIECE
ENGAGING MEANS
Billy M. Horton, 9712 Kensington Parkway,
Kensington, Md.
Filed June 3, 1960, Ser. No. 33,779
5 Claims. (Cl. 151—41.75)

The present invention relates to fastening devices and more particularly to wire nuts which may be employed with screws or bolts to fasten members to sheet metal bases or supports.

There are available today a number of nuts adapted particularly for utilization with sheet metal. An example of such a device is the flat metal nut which is a metal stamping widely used in such applications. The flat metal nut, although having a great many uses, cannot be utilized where the worker has access to only one side of the sheet metal piece without providing a relatively large hole for insertion of the nut.

The present invention provides an inexpensive wire nut which may be employed in those applications where a workman does not have access to the back of a sheet metal piece and further to provide a wire nut with a self-locking feature so that lock washers do not have to be employed. Wire nuts, as such, have been disclosed in the prior art, but they do not simultaneously engage the threads of the screw device and the member through which they are inserted so as to provide a self-locking device. Numerous efforts have been made to overcome this latter difficulty by securing the nut to the inaccessible side of a sheet metal piece before mounting the piece in the environment where the one surface becomes inaccessible. However, such wire nuts have not found wide applicability since the expense and time involved in securing a wire nut to the sheet metal piece is not warranted by the convenience afforded.

It is therefore a broad object of the present invention to provide an economical, easily fabricated wire nut which may be readily employed in locations where access is had only to one surface of a sheet metal piece and further to provide a wire nut having a self-locking feature so that lock washers do not have to be employed.

It is a further object of the present invention to provide a wire nut which may be applied to a sheet metal piece from the same side as the bolt employed therewith.

Still another object of the present invention is to provide self-locking wire nut in accordance with the above objects which may be installed through a round hole with ordinary hand tools.

In accordance with one embodiment of the present invention, a piece of strong, resilient wire, such as piano wire, is formed into a helix having an internal diameter conforming generally to the root diameter of the threaded portion of the bolt or screw with which the nut is to be employed. The helical turns have a pitch which conforms generally to the pitch of the threads of the screw so that the screw may be readily threaded into the nut. Several of the turns of wire are deformed so as to provide outwardly extending segments for engaging the front and rear surfaces of the sheet metal piece so that the nut cannot be drawn directly through the hole in the plate. The segments are shaped such, however, that the nut may be passed through the hole by proper manipulation from the same side of the plate as that from which the bolt is to be inserted. More particularly, the deformed turns of wire have opposed arcuate segments for securely receiving the screw or bolt and outwardly extending segments or loops to engage the sheet metal. The outwardly extending segments are disposed on both sides of the sheet metal and are connected by an arcuate segment extending through the hole. One of the segments on the accessible side of the sheet terminates in a long tail-like member formed at its end into a sharp or chisel-like point directed toward the sheet metal member. In consequence, when a further member to be secured to the sheet metal piece is placed against the nut, the chisel point is pressed into the sheet metal member and provides a locking arrangement.

The present invention is not restricted to wire nuts which are to be employed in locations where access is had only to one side of a member, and by eliminating that portion of the apparatus which is adapted to extend through the hole in the sheet metal plate, a nut is provided which has general applicability. In such an arrangement, the end of the device which normally would come up through the hole in the plate is turned over the adjacent outwardly extending segment and is adapted to press against the back of the member so as to provide a locking arrangement.

It is another object of the present invention to provide a wire nut fabricated from a single length of wire which may be threaded through the same hole in the sheet metal plate as the fastening device or screw and from the same side.

It is another object of the present invention to provide a wire nut fabricated from a single length of wire and having a locking member which eliminates the necessity of a lock washer particularly for uses where the apparatus is subjected to vibration.

The above and still further objects, features and advantages of the present invention will become apparent upon consideration of the following detailed description of several embodiments thereof, especially when taken in conjunction with the accompanying drawings, wherein.

Figure 8:
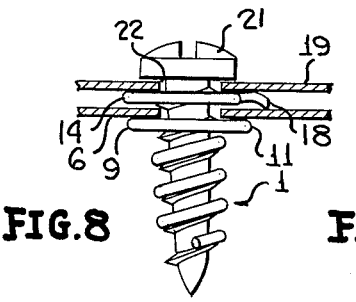
Figure 9:
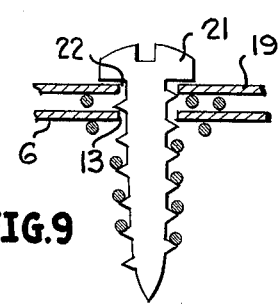
Figure 10:
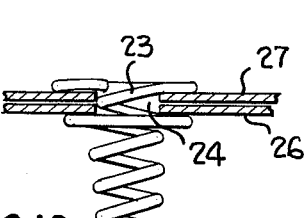
Figure 11:
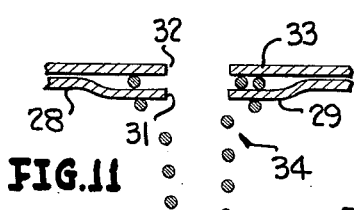
Figure 12:
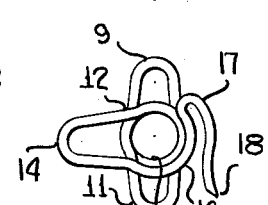
Figure 13:
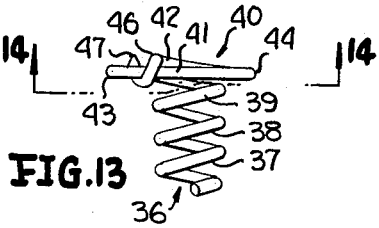
Figure 14:
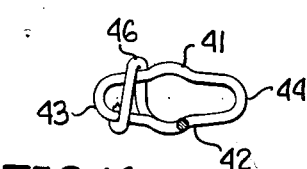
Figure 15:
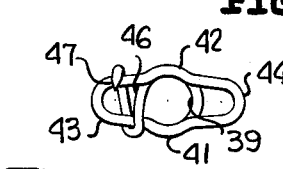

FIGURE 8 of the accompanying drawings is a view in side elevation illustrating the utilization of the wire nut of the present invention in securing two sheet metal plates together;

FIGURE 9 is a cross sectional view in elevation of the arrangement illustrated in FIGURE 8;

FIGURE 10 is a side view of a variation of the wire nut employed to fasten together two contacting metal pieces;

FIGURE 11 is a cross sectional view in elevation of the wire nut of the present invention employed to fasten two sheet metal pieces together wherein one of the sheet metal pieces is recessed so that the sheet metal plates may be brought into contact with each other;

FIGURE 12 is a top view of a variation of the wire nut illustrated in FIGURES 1 to 9;

FIGURE 13 is a view in elevation illustrating a second embodiment of the invention;

FIGURE 14 is a cross sectional view taken along line 14—14 of FIGURE 13;

FIGURE 15 is a top view of the nut illustrated in FIGURE 13; and

Figure 16:
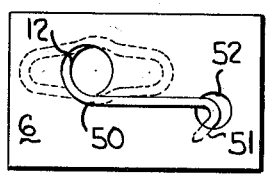

FIGURE 16 is a top view of a further embodiment of the invention.

Figure 1:
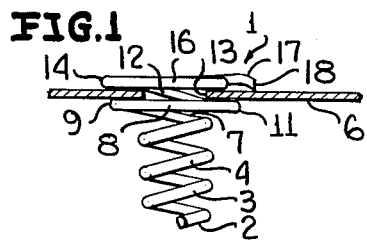
FIGURE 1 is a side elevational view of a first embodiment of the wire nut of the present invention attached to a sheet metal plate.
Figure 2:
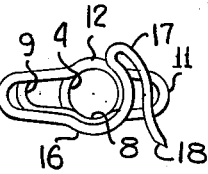
FIGURE 2 is a top view of the nut of FIGURE 1 with the upper portion removed.
Figure 3:
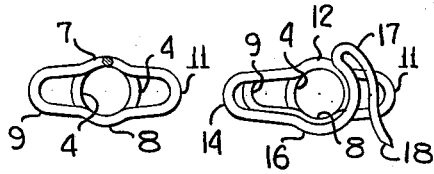
FIGURE 3 is a top view of the first embodiment of the wire nut of the present invention.
Figure 4:
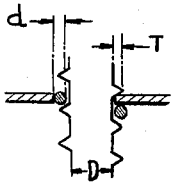
FIGURE 4 is a drawing employed in describing physical relationship between the size of the wire employed, the hole diameter, the root diameter of the screw device and the thread depth.

Referring now specifically to FIGURES 1, 2 and 3 of the present invention, there is illustrated a wire nut generally designated by the reference numeral 1 having three helical turns of wire 2, 3 and 4 disposed below a sheet metal plate 6 in which the nut is secured. The turns 2, 3 and 4 are generally of the same diameter and have an inner diameter approximately equal to the root diameter of the screw with which the nut is to be employed. Also, the pitch of the turns 2, 3 and 4 is generally equal to the pitch of the threads of the screw and, as illustrated in FIGURE 9, the diameter of the wire is such that the wire is tangent to at least one of the sides of the threads of the screw. The upper end of the turn of wire 4 terminates (See FIGURE 2) in an arcuate segment 7 of the next turn of wire. The next turn of wire actually comprises two arcuate segments 7 and 8 which are generally diametrically opposed and an outwardly extending segment 9 which joins the segments 7 and 8. The segment 9 is adapted to engage the under side of the plate 6 and the segments 7 and 8 from portions of a helix as defined by the turns 2, 3 and 4.

The segment 8 terminates in a second outwardly extending segment 11 which conforms generally in shape and size to the segment 9 and is diametrically opposed thereto. The segment 11 is also adapted to engage the under side of the plate 6, as illustrated in FIGURE 1 and terminates in an arcuate segment 12 (See FIGURES 1 and 3). The arcuate segment 12 conforms in size and shape to the segment 7 and is adapted to extend through a hole 13 in the plate 6 through which a screw device is adapted to pass. The arcuate segment 12 terminates in a further outwardly extending segment 14 disposed in this embodiment above the segment 9. The segment 14 is adapted to engage the upper surface of the plate 6 and is connected to a further arcuate segment 16. The segment 16 is larger in diameter than the other arcuate segments so as to permit easy inserting of the screw device into the nut and permit the nut to be held against rotation upon rotation of the screw device. The segment 16 terminates in a curved end portion 17 which has a pointed, chisel-shaped or sharp end 18 formed thereon which is bent downwardly towards the plate 6 or upwardly toward the member being attached to provide contact over a limited area. Consequently, when the portion 17 is pressed downwardly, the sharp end 18 digs into the member toward which it is directed. Also the end 18 may extend into an aperture or notch provided to receive this end so as to prevent turning of the nut, and provide a locking arrangement.

The spacing between these segments 7 and 12, and 8 and 16 should be such relative to the spacing between the threads of the screw so that when a screw is threaded into the nut 1, the segments 9 and 11 are pulled upwardly and the plate is securely gripped between the segments 9, 11, 14 and 16, and the point 18 is pressed into the plate.

The hole 13 should be of a diameter at least equal to the root diameter of the screw plus the diameter of the wire, since the hole must accommodate both the shank of the screw and the arcuate segment 12 of the wire nut 1. It is not necessary that the hole be of a precise size and, in fact, it is generally made somewhat larger than the minimum as set forth above. It is a requirement concerning the hole that it be small enough that a sufficient surface is provided for engagement by the segments 9, 11, 14 and 16 to prevent the nut being drawn through the hole 13. For maximum strength the hole diameter should be less than the following sum: one root diameter plus one thread depth plus one wire diameter, i.e. $D+T+d$ where D is the root diameter of the screw device, T is the depth of the screw thread, and $d$ is the wire diameter; these dimensions being illustrated in FIGURE 4. It will be noted by reference to FIGURE 4 that with this maximum dimension of the hole relative to the dimension D, T and $d$, the arcuate segment 12 is prevented by the plate 6 from expanding sufficiently to slide over the thread with which it is in contact.

Figure 5:
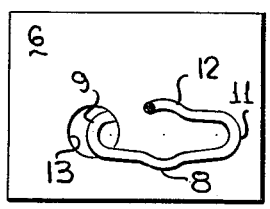
FIGURES 5, 6 and 7 are top views of the wire nut of the present invention showing various steps during insertion of the nut through a hole in a sheet metal plate.
Figure 6:
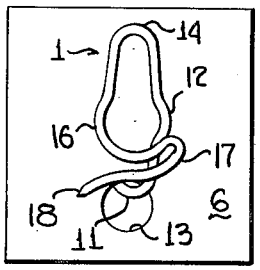
Figure 7:
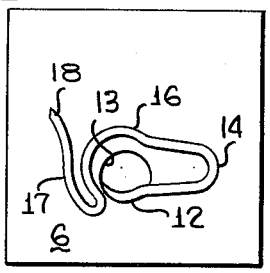

As previously indicated, the wire nut of the present invention may be inserted through the hole 13 from the same side of the panel 6 as the screw or bolt with which it is to be subsequently employed. Referring specifically to FIGURE 5, the first step in insertion of the nut is to thread the turns 2, 3 and 4 through the hole 13. Employing a screwdriver which has been eliminated from the drawing so as not to mask the important features, the nut 1 is slid to one side or the other, specifically, the right side in FIGURE 5, so that a portion of the segment 9 is disposed below the plate 6 and a portion is disposed above it. The nut 1 is then rotated clockwise and at the same time is pushed to the left, FIGURE 6, so that the remaining portion of the segment 9 and a first part of the segment 11 pass under the panel 6. In the final step, clockwise rotation is continued and the nut is pushed downwardly and toward the left as viewed in FIGURE 7, so that the segment 11 passes completely under the plate 6, and the arcuate portion 12 lies against the side of the aperture 13. The nut 1 is now completely installed and may be employed to join together two pieces of sheet metal or to join any device to the plate 6.

Referring now specifically to FIGURE 8 in which the same reference numerals are employed for corresponding elements as are employed in FIGURES 1 to 7, a further plate 19 is disposed above the plate 6 with the portion of the nut 1 above the plate 6 lying between the two plates. A screw device, such as a commercially available and standard size sheet metal screw 21, is inserted in an aperture 22 in the plate 19 and threaded into the wire nut 1. The screw now may be drawn up tightly so as to draw up the segments 9 and 11 and cause segment 17 to be straightened and to cause the point 18 to dig into the plate 6 to provide for locking of the nut. As previously indicated, the plate 6 is strongly grasped between the segments 9 and 11 below the plate and the segments 14 and 16 above the plate.

It is apparent from the above that the objects of the invention have been obtained in that the wire nut may be inserted from the same side of the sheet metal plate as the screw and further, the nut provides positive locking so that a lock washer does not have to be employed. In FIGURES 8 and 9, the plates 6 and 19 are spaced from one another but various arrangements for overcoming this may be employed. Specifically the nut and screw utilized therewith may have a pitch great enough to span the total thickness of the two plates in which case the nut may be inserted through holes 22 and 13 in the two plates with the head of the screw 21 engaging the upper arcuate portions 12 and 16 of the nut. If the thickness of the two plates is too great to employ a nut and bolt having a pitch sufficient to accommodate their thickness the arrangement of FIGURE 10 may be employed.

In FIGURE 10, the device is essentially identical with that illustrated in FIGURES 1 through 9 but an additional half turn 23 is employed which is wholly contained within aligned apertures 24 of the plates designated by reference numerals 26 and 27.

A further arrangement which may be employed to permit the plates to be brought into contact with one another is that illustrated in FIGURE 11. A lower plate 28 is provided with a hemispherical or other arcuate depression or dome 29 having an aperture 31 in the center thereof. The aperture 31 is aligned with an aperture 32 in an upper plate 33 and a wire nut 34 is situated in the plate 28 with the portion above the plate being disposed in the concave dome 29. The nut 34 is identical with that illustrated in FIGURES 1 through 9 and the only difference is in the plate 28.

In the embodiment of the invention illustrated in FIGURES 1 to 11, the outwardly extending segments are shown aligned. Actually, such an arrangement is not necessary to proper operation of the device. Referring now to FIGURE 12, the arcuate segment 14 is disposed at right angles to the segments 9 and 11. This embodiment is suitable for use with slightly thicker sheet metal since arcuate segment 12 constitutes a larger portion of a helical coil between segments 11 and 14. The operation of the screw and the advantages incident to its use are not affected by this arrangement of the segments.

Referring now specifically to FIGURES 13 to 15 of the accompanying drawings, there is illustrated a second embodiment of the invention which is adapted to be utilized where access is had to the back of the plate with which the device is to be employed. In this embodiment of the invention that portion of the nut of FIGURES 1 to 12 which extends through the hole in the sheet metal plate is eliminated. Specifically, a nut 36 in accordance with the second embodiment of the invention comprises a plurality of helical turns 37, 38 and 39, the upper turn of which; that is, turn 39 is connected to a further turn 40 having two diametrically-opposed, arcuate segments 41 and 42 and two outwardly extending segments 43 and 44. The segment 42 terminates in a length of wire 46 which extends across the top of the base of the outwardly extending segment 43, is then passed under the segment 43 and comes up over the top again where it ends in a sharp upwardly directed point 47. The various turns 37 through 40 of the nut 36 serve the same functions as the corresponding turns of the nut 1 of FIGURES 1 to 12 and serve to engage a screw device with the segments 43 and 44 engaging the rear side of a plate to which a member is to be fastened. The length of wire 46 is wrapped around the segment 43 and serves to hold the nut 36 together, preventing the turns 37 to 40 from spreading when the nut is tightened. Further the sharp end 47 digs into the under side of the plate as the screw device is threaded into the nut and tightened so as to prevent rotation of the nut. Therefore, the sharp end 47 serves as a locking member for the end adjacent to the sheet metal. The other end of the wire is held tightly by the frictional drag between the wire and the screw.

In each of the nuts illustrated three helical turns are provided. This is not intended to be a limiting feature of the device since more turns may be employed. It is recommended however, that at least three turns be provided so as to obtain sufficient frictional drag between the wire nut and screw, and prevent spreading of the turns under load.

In another embodiment of this wire nut, shown in FIGURE 16, arcuate segment 12 is joined to locking segment 50 having a locking tongue 51 suitable for insertion through hole 52 of sheet metal plate 6. The locking tongue 51 and the hole 52 provide another means for retaining the nut in its proper position prior to and during the insertion and tightening of the screw device, eliminating the need for segment 17 and sharpened end 18 of FIGURES 1-12. If locking tongue 51 is bent upward this embodiment can be used with the locking segment 50 below the plate 6.

The fastening devices of the present invention are described as being fabricated from wire having a round cross-section. It is not necessary to limit the invention to utilization with a wire having a round cross-section and wires having square, rectangular, trapezoidal and other cross-sections may be employed.

The nuts also may be fabricated from other materials than metal wire and specifically, high strength, resilient plastics may be employed. For instances, a glass fiber impremnated with an expoxy resin is applicable; such material being presently employed in the manufacture of glass fishing rods.

Further, the metallic wire nuts may be coated with a suitable material to effect vibration damping so as to reduce noise resulting from mechanical vibration. The coating may be a thermal setting material which sets at room temperature. This material may be applied in a tacky condition a sufficiently short time before utilization of the devices, commensurate with the characteristic drying time of the material, so that the material has not set prior to use.

While I have described and illustrated several embodiments of my invention, it will be clear that variations of the details of construction which are specifically illustrated and described may be resorted to without departing from the true spirit and scope of the invention as defined in the appended claims.

What I claim is:

1. A wire nut for use with a threaded member comprising a length of coiled wire having a pitch generally conforming to the pitch of the threads of a threaded member with which the wire nut is to be emloyed, the two end turns of said coiled wire providing means to secure said coil to a workpiece, one of said turns comprising first and second curved diametrically opposed segments and first and second diametrically opposed radially outwardly extending segments, said first and second curved segments having a spacing therebetween conforming to the root diameter of the threaded member, said first curved segment having one end connected to the adjacent turn of said coiled wire, said first radial segment extending between the other end of said first curved segment and one end of said second curved segment, said second turn of wire comprising third and fourth diametrically opposed curved segment and a third radially outwardly extending segments, all of said curved segments being helically disposed and generally conforming to the radius of curvature of the body of said threaded member, said second radially outwardly extending segment connected between the other end of said second curved segment and one end of said third curved segment, and said third radial segment extending between said third and fourth curved segments, all of said radial segments being elongated flat loops which extend radially outwardly a substantial distance beyond the diameter of said coiled wire, said third curved segment being adapted to pass through a screw receiving hole in said workpiece, said first and second radial segments lying on one side of said workpiece and the third radial segment lying on the other side thereof said fourth curved segment terminating in a section of wire having a pointed end, said end being disposed out of the plane of said section of wire and directed toward said other side of said workpiece.

2. A wire nut for use with a threaded member comprising a length of helically coiled wire having at least two adjacent turns providing means for securing said nut to a work piece, said two turns having a pitch generally conforming to the pitch of the threads of a threaded member with which said wire nut is to be employed, one of said turns comprising first and second curved diametrically opposed segments and first and second radial segments extending radially outward to an inner diameter greater than the maximum diameter of the threads of the threaded member, said curved segments having a spacing therebetween conforming to the root diameter of the threaded member, said first radial segment extending between one end of each of said curved segments, said second turn of wire comprising third and fourth curved segments and a third radial segment extending radially outward to an inner diameter greater than the maximum diameter of the threads of the threaded member, said second radial segment connected between the other end of said second curved segment and one end of said third curved segment, and said third radial segment extending between said third and fourth curved segments, said third curved segment being adapted to pass through a screw receiving hole in a body, said first and second radial segments lying on one side of the member and the third radial segment lying on the other side thereof.

3. The combination according to claim 2 wherein said fourth curved segment terminates in a sharpened end directed towards said one of said turns.

4. The combination according to claim 2, wherein said third radial segment lies in a range of angles of from 0° to 90° with respect to one of said first and second radial segments.

5. The combination according to claim 2 further comprising a section of wire terminating in a shaped end directed toward the screw receiving member, said fourth curved segment terminating in said section of wire.

References Cited in the file of this patent

UNITED STATES PATENTS

| | | |
|---|---|---|
| 1,264,677 | Murrell | Apr. 30, 1918 |
| 1,311,646 | Gordon | July 29, 1919 |

FOREIGN PATENTS

| | | |
|---|---|---|
| 152,336 | Great Britain | Oct. 11, 1920 |